(No Model.)
H. WEBER.
BALL BEARING WHEEL HUB FOR VEHICLES.
No. 583,556. Patented June 1, 1897.
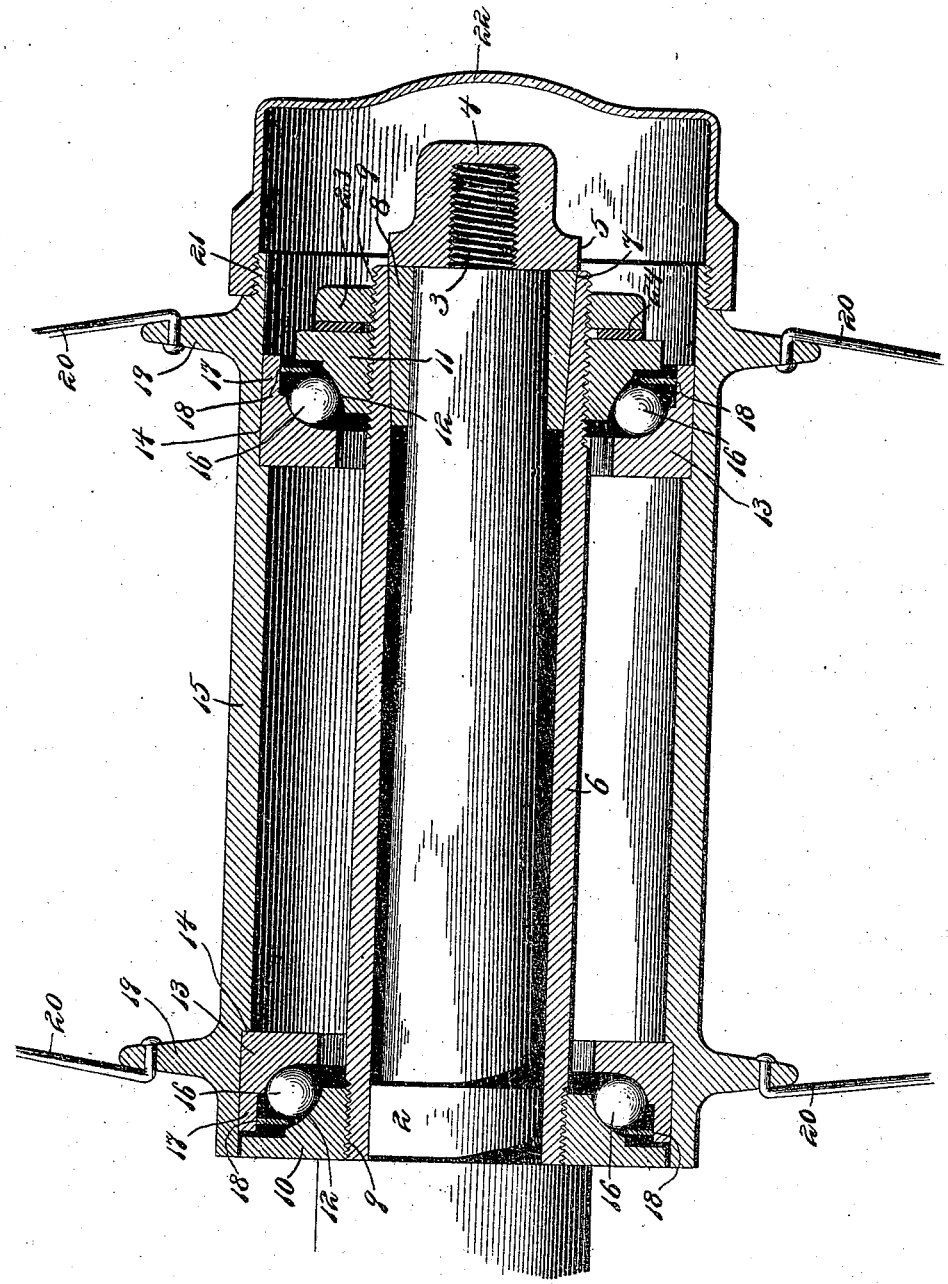
Witnesses
Milton O'Connell,
Inventor
Herman Weber,
By his Attorneys,

UNITED STATES PATENT OFFICE.

HERMON WEBER, OF COLORADO SPRINGS, COLORADO.

BALL-BEARING WHEEL-HUB FOR VEHICLES.

SPECIFICATION forming part of Letters Patent No. 583,556, dated June 1, 1897.

Application filed November 24, 1896. Serial No. 613,348. (No model.)

*To all whom it may concern:*

Be it known that I, HERMON WEBER, a citizen of the United States, residing at Colorado Springs, in the county of El Paso and State of Colorado, have invented a new and useful Ball-Bearing Wheel-Hub for Vehicles, of which the following is a specification.

This invention relates to vehicle-wheels, and more especially to the hubs thereof.

The main and primary object of the present invention is to provide a new and useful ball-bearing vehicle-hub constructed in such a manner as to adapt the same for use on the axle-spindles of ordinary carriages or wagons, so that wheels having hubs constructed in accordance with the present invention are readily interchangeable with wheels of any ordinary carriage or wagon without altering the axles or spindles thereof in any way, while at the same time making use of the ordinary axle-nuts to secure the hubs in place on the axle-spindles.

With these and other objects in view, which will readily appear as the nature of the invention is better understood, the same consists in the novel construction, combination, and arrangement of parts hereinafter more fully described, illustrated, and claimed.

In the drawing the figure is a longitudinal sectional view of a ball-bearing hub constructed in accordance with the present invention.

Referring to the accompanying drawing, the numeral 1 designates the axle-spindle of an ordinary carriage or wagon, which spindle has formed at its inner end the usual annular collar 2 and is provided at its outer end with the threaded tip 3, which receives the ordinary axle-nut 4, having at its inner edge the annular binding-flange 5, serving to secure a wheel on the spindle in the usual manner.

In the present invention the axle-spindle 1 is designed to have fitted thereon a ball-bearing hub having an inner stationary axle sleeve or skein 6, extending the entire length of the spindle 1 and of a slightly greater diameter than the spindle, so as to have its inner end snugly fit over the annular collar 2 at the inner end of the spindle, and said axle sleeve or skein 6 of the ball-bearing hub is interiorly tapered or flared within its outer end portion, as at 7, to receive therein an exteriorly-tapered wedge-thimble 8, having a cylindrical bore receiving the axle-spindle 1. The exteriorly-tapered wedge-thimble 8 is slipped over the outer end of the axle-spindle 1 and inserted into the interiorly tapered or flared end portion 7 of the sleeve 6, and by then placing the nut 4 on the spindle-tip 3 and screwing the same against the outer end of the thimble 8 the latter will be tightly wedged within the outer end of the sleeve 6, so as to firmly secure the sleeve in place on the axle-spindle.

The inner axle sleeve or skein 6 of the hub is exteriorly threaded at its opposite ends, as at 9, to receive thereon the interiorly-threaded bearing-cones 10 and 11, respectively, the bearing-cone 10 being a stationary cone fitted on the inner end of the sleeve 6, while the cone 11 is adjustable on the threaded outer end portion of the sleeve 6 to provide for tightening up the bearings whenever required in the usual way.

The oppositely-located bearing-cones 10 and 11 are provided with the usual inner concaved bearing-faces 12, opposed to the corresponding faces of the ball-cup rings 13, which cup-rings are fitted within the interior shouldered seats 14, formed in the inner periphery of the hollow cylindrical hub-body 15, respectively at opposite ends of such body. The said ball-cup rings 13, together with the adjacent cones 10 and 11, inclose ball-races, in which are arranged a circular series of bearing-balls 16, and by a proper adjustment of the adjustable cone 11 wear of the balls 16 may be readily compensated for, as is well understood. The ball-cup rings 13 are provided at their outer edges with the horizontal flange extensions 17, within which flange extensions are fitted flat steel retaining-rings 18, which project inwardly toward the longitudinal center of the hub and serve to properly retain the bearing-balls in place.

The hollow cylindrical hub-body 15, carrying the ball-cups 13, is provided near opposite ends with the exterior annular spoke-attaching flanges 19, to which are connected in the usual way the ordinary wire wheel-spokes 20, which serve to complete a wheel of the ordinary bicycle type, and said hub-body 15 is provided with an exteriorly-threaded flange 21 at its outer end, which is engaged by a removable interiorly-threaded flanged dust-cap 22, which covers the entire outer end of the hub and excludes dust therefrom.

The adjustable bearing-cone 11 is secured fast in any adjusted position by means of a lock-nut 23, working on the threaded outer end portion of the sleeve 6 and binding against the washer 24, interposed between the same and said cone 11.

It will be observed that the herein-described hub is very simple in construction and easily adjusted, while at the same time being adapted to be secured on any ordinary carriage or wagon axle without change or alteration of such axle and by means of the usual axle-nut thereof. The hub may also be well adapted for use in connection with bicycles and vehicles of all sorts, and changes in the form, proportion, and the minor details of construction may be resorted to without departing from the principle or sacrificing any of the advantages of this invention.

Having thus described the invention, what is claimed, and desired to be secured by Letters Patent, is—

1. The combination with an axle-spindle and the axle-nut thereof, of an inner axle sleeve or skein adapted to be fitted on said axle-spindle and extending the entire length thereof, said sleeve or skein being interiorly tapered or flared within its outer end portion, and an exteriorly-tapered wedge-thimble fitting on the spindle within the tapered or flared outer end portion of the sleeve and engaged by said axle-nut, substantially as set forth.

2. In a wheel, the combination with the axle-spindle and the nut thereof, of an inner stationary sleeve or skein fitted on the spindle and interiorly tapered or flared within its outer end portion, an exteriorly-tapered wedge-thimble fitted on the spindle within the tapered or flared portion of the sleeve and engaged by said nut, and a hollow cylindrical hub-body having a ball-bearing support on said sleeve or skein, substantially as set forth.

In testimony that I claim the foregoing as my own I have hereto affixed my signature in the presence of two witnesses.

HERMON WEBER.

Witnesses:
W. H. WAHL,
C. C. MEDBERY.